(12) United States Patent
Rossi et al.

(10) Patent No.: US 6,714,707 B2
(45) Date of Patent: Mar. 30, 2004

(54) OPTICAL CABLE HOUSING AN OPTICAL UNIT SURROUNDED BY A PLURALITY OF GEL LAYERS

(75) Inventors: Michael T. Rossi, Maiden, NC (US); Nicholas V. Nechitailo, Conover, NC (US); Brian Risch, Hickory, NC (US)

(73) Assignee: Alcatel, Paris (FR)

( * ) Notice: Subject to any disclaimer, the term of this patent is extended or adjusted under 35 U.S.C. 154(b) by 136 days.

(21) Appl. No.: 10/053,627

(22) Filed: Jan. 24, 2002

(65) Prior Publication Data

US 2003/0138226 A1 Jul. 24, 2003

(51) Int. Cl.$^7$ ................................. G02B 6/44
(52) U.S. Cl. ............................................ 385/109
(58) Field of Search ............................... 385/109

(56) References Cited

U.S. PATENT DOCUMENTS

| | | |
|---|---|---|
| 5,000,539 A | 3/1991 | Gareis |
| 5,187,763 A | 2/1993 | Tu |
| 5,268,971 A | 12/1993 | Nilsson et al. |
| 5,384,875 A | 1/1995 | Shannon et al. |
| 5,384,880 A | 1/1995 | Keller et al. |
| 5,557,698 A | 9/1996 | Gareis et al. |
| 5,672,640 A | 9/1997 | Brauer |
| 5,761,362 A | 6/1998 | Yang et al. |
| 5,838,864 A | 11/1998 | Patel et al. |
| 5,905,833 A | 5/1999 | Sheu |
| 5,911,023 A | 6/1999 | Risch et al. |
| 5,999,677 A | 12/1999 | Moncisvais et al. |
| 6,085,009 A | 7/2000 | Risch et al. |
| 6,088,499 A | 7/2000 | Newton et al. |
| 6,160,939 A | 12/2000 | Sheu |

*Primary Examiner*—Javaid H. Nasri
(74) *Attorney, Agent, or Firm*—Sughrue Mion, PLLC

(57) ABSTRACT

An optical fiber cable including a buffer tube wherein the optical unit is maintained in an axial center location of the buffer tube and protected from contact with an inner wall of the buffer tube. At least first and second gel layers are interposed between the buffer tube and the optical unit, wherein the first gel layer surrounds the optical unit, the second gel layer surrounds the first gel layer, and the first and second gel layers have different rheological properties. The inner gel layer may have a yield stress and a viscosity which are lower than a yield stress and a viscosity of the outer gel layer. The lower yield stress and viscosity of the inner gel layer serves to maintain the optical unit in an axial center position within the buffer tube and facilitates easy re-positioning of the optical unit to the axial center position when the buffer tube is flexed or bent. As a result, the optical unit may be maintained in a low stress state and stress-induced attenuation may be prevented.

31 Claims, 3 Drawing Sheets

OPTICAL CABLE HOUSING AN OPTICAL UNIT SURROUNDED BY A PLURALITY OF GEL LAYERS

FIELD OF THE INVENTION

The present invention relates to an optical fiber cable comprising an optical unit and a plurality of gel layers surrounding the optical unit. In particular, the present invention relates to an optical fiber cable comprising a buffer tube housing an optical unit and a plurality of gel layers having different rheological properties surrounding an optical fiber.

BACKGROUND OF THE INVENTION

Optical fiber cables are used to transmit information at very high rates over long distances. Optical fiber cables may be classified into three general classifications based on cable structure: loose tube, monotube, and slotted core. In loose tube and monotube cables, buffer tubes are utilized as the primary structure for protecting the thin optical fibers contained within. In particular, the buffer tubes typically house an optical unit such as one or more loose optical fibers or an optical fiber ribbon stack having a plurality of optical fibers held together in a planar array by a common matrix material.

In a loose tube cable, a plurality of buffer tubes are stranded, helically or reverse helically, around a central strength member to form a stranded core. In addition to the buffer tubes, filler rods may be stranded around the central strength member in order to provide symmetry in design for fiber counts lower than that of a full fiber count cable. In a monotube cable, one or more optical fibers are housed in a single, centrally located buffer tube. Typically, the buffer tubes or stranded core is jacketed with an additional protective layer. Further, reinforcing yarns or fibers as well as waterblocking materials in the form of gels or hot melts, water swellable powers, yarns or tapes, and/or corrugated armor may be place between the jacket and the inner cable layers.

In a slotted core cable, the optical fibers reside in channels or slots which are generally filled with a gel material. These channels form a helical path along the longitudinal axis of the cable.

The buffer tubes' primary function is protect the delicate optical fibers housed therein. Accordingly, control of the modulus, percent elongation to break, coefficient of thermal expansion, shrinkage, swelling and other physical properties of the buffer tubes is very important. Buffer tubes are typically made from "engineering resins" such as polybutylene terepthalate (PBT), polycarbonate (PC), polyarnides such as nylon-12, polyolefin materials such as polyethylene-polypropylene copolymers and isotactic polypropylene (I-PP), or some layer combination of the above. See U.S. Pat. No. 6,085,009.

In the cable industry, it is well known that changes in ambient conditions lead to differences in water vapor pressure between the inside and the outside of a plastic cable jacket. This generally operates to diffuse moisture in a unidirectional manner from the outside of the cable to the inside of the cable. Eventually, this will lead to an undesirably high moisture level within the cable, especially if a plastic jacket is the only barrier to the ingress of the moisture. Water may also enter the cable because of rodent attacks or mechanical impacts that cause openings in the sheath system. While the presence of water within an optical fiber cable may not immediately impact its performance, the passage of the water along the cable interior to connection points or terminals or associated equipment inside closures, for example, may cause problems, especially in freezing environments and should be prevented.

The buffer tubes may be filled with a water blocking compound such as a thixotropic gel to prevent water ingress while allowing fiber movement during cable expansion or contraction. It is also know to use water swellable or superabsorbent materials, such as tape, power or yarn formed of polyacrylates with carboxylate functional groups, partially neutralized polyacrylic acid, polyarnides, or copolymers thereof, which can absorb water in the buffer tubes. Further, it is known to use a secondary low molecular weight oil to pre-wet the optical fibers and optical fiber ribbons in order to prevent water migration down interstices through the optical unit by way of capillary action.

Conventional buffer tubes are typically manufactured with a single thixotropic gel surrounding the optical unit. The yield stress of the gel allows the optical unit to freely move within the buffer tube so that the optical fiber may drift to locations other than the axial center of the buffer tube. However, it is important to prevent the optical unit from contacting the buffer tube wall which may result attenuation problems due to microbending and high stress.

The thixotropic gel material generally includes a thickening or gelling agent in a liquid carrier. Traditionally, three types of gels materials have been used in fiber-optic cables: (1) gels based on polar oils such as polyols; (2) gels based on natural or synthetic hydrocarbon oils; and (3) gels based on silicone oils. Organic and non-organic thickeners are typically present as relatively isometric colloidal particles. Gelling agents form a physical network structure in which the polymeric base oil molecules interact with the gelling agent through entanglements, adsorption onto the surface of particles such as pyrogenic silica, and/or some other secondary interaction. When a low stress is applied to a gel-like composition, the material acts substantially as a solid. If the stress is above a critical value (commonly known as the yield-stress of the material), then the secondary interactions are disturbed, the material flows, and as shear rate increases, viscosity decreases rapidly (i.e., materials having such characteristics are called "thixotropic"). This decrease in viscosity is largely reversible because it is typically caused by the temporary breakdown of secondary interactions between gelling agents and polymeric base oils. These interactions can reform following the release of shearing forces on the material.

The selection of gel materials is an important consideration in buffer tube manufacture since gel materials which are compatible with the material of the buffer tube may not be compatible with or protective of the optical unit it surrounds. Non-compatible gel materials can swell buffer tube polymers and are able to extract the additives therein and reduce the thermo-oxidative stability of the buffer tubes. U.S. Pat. No. 6,085,009 discloses a water blocking gel which is compatible with polyefin buffer tubes and is made of a polyolefin oil, wherein only a very small fraction of the polyolefin species have a molecular weight below about 2000.

SUMMARY OF THE INVENTION

The present invention is adapted to provide an optical fiber cable including a buffer tube structure wherein the optical unit is located in the buffer tube and protected from contact with an inner wall of the buffer tube. According to the present invention, there is provided an optical fiber cable comprising a buffer tube housing an optical unit including at least one optical fiber, and at least first and second gel layers interposed between the buffer tube and the optical unit, wherein the first and second gel layers have different rheological properties. The first gel layer surrounds the optical unit and the second gel layer surrounds the first gel layer.

In accordance with a preferred embodiment of the present invention, the inner gel layer may have a yield stress and a viscosity which are lower than a yield stress and a viscosity of the outer gel layer. The lower yield stress and viscosity of the inner gel layer serve to maintain the optical unit in an axial center position within the buffer tube and facilitate easy re-positioning of the optical unit to the axial center position when the buffer tube is flexed or bent. As a result, the optical unit may be maintained in a low stress state and stress-induced attenuation may be prevented.

The above and other features of the invention including various and novel details of construction and process steps will now be more particularly described with reference to the accompanying drawings and pointed out in the claims. It will be understood that the particular optical fiber cable embodying the invention is shown by way of illustration only and not as a limitation of the invention. The principles and features of this invention may be employed in varied and numerous embodiments without departing from the scope of the invention.

BRIEF DESCRIPTION OF THE DRAWINGS

These and other features, aspects and advantages of the present invention will become better understood with reference to the following detailed description, appended claims, and accompanying drawings, wherein:

DESCRIPTION OF THE PREFERRED EMBODIMENTS

Figure 1:
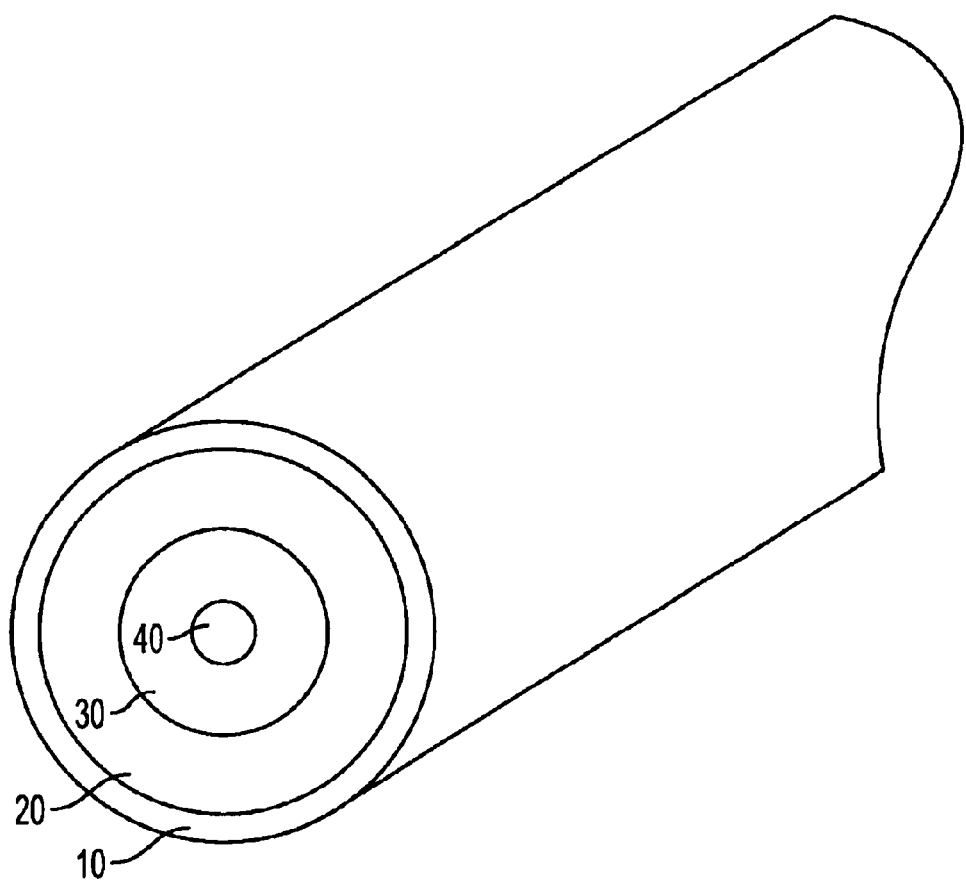
FIG. 1 illustrates a cross-sectional view of a buffer tube structure in accordance with the preferred embodiment of the present invention.

Referring to FIG. 1, the optical fiber cable structure in accordance with a preferred embodiment of the present invention comprises a buffer tube 10 housing an optical fiber unit 40 such as one or more optical fibers or an optical fiber ribbon stack. Interposed between the buffer tube 10 and the optical fiber unit 40 is a first or inner gel layer 30 and a second or outer gel layer 20. In particular, the inner gel layer 30 surrounds the optical fiber unit 40 and the outer gel layer 20 surrounds the inner gel layer 30 and contacts an inner wall surface of the buffer tube 10.

In accordance with a preferred embodiment of the present invention, the inner gel layer 30 and the outer gel layer 20 may have different rheological properties such that the inner gel layer has a yield stress and a viscosity which are lower than a yield stress and a viscosity of the outer gel layer 20. The lower yield stress and viscosity of the inner gel layer 30 serves to maintain the optical unit 40 substantially in an axial center position within the buffer tube 10 and facilitates easy re-positioning of the optical unit 40 to the axial center position when the optical fiber cable is flexed. However, the optical unit 40 may be offset from the axial center of the buffer tube 10 as long as it is protected by the inner and outer gel layers 30 and 20 from contact with the inner wall of the buffer tube 10. This advantageously allows the optical unit 40 to attain a low stress state and prevent stress-induced attenuation. Further, since the inner and outer gel layers 30 and 20 have different yield stresses and viscosities, the inner and outer gel layers 30 and 20 do not mix together and are maintained in their respective inner and outer positions within the buffer tube.

The inner and outer gel layers 30 and 20 may be comprised of a mixture of base oils and thickeners. The base oils may be comprised of polyolefins such as Durasyn™ poly alphaolefin oils commercially produced by BP or Synthetic Hydrocarbon Fluids (SHF) from Exxon/Mobil. Alternatively, the base oil may be comprised of a mixture of the above fluids combined with polybutene oils such as Indipol™ polybutene produced by BP or Parapol™ polybutene produced by Exxon/Mobil. The base oil of the outer gel layer 20 should be selected to ensure appropriate compatibility with the buffer tube 10 unless a swellable inner layer of the buffer tube 10 is desired. For example, U.S. Pat. No. 6,085,009, which is incorporated herein by reference, discloses a water blocking gel which is compatible with polyolefin based buffer tubes and comprises a polyolefin base oil, wherein substantially all fractions of the polyolefin base oil have a minimum molecular weight above approximately 2000, a thixotropic agent and a thermal oxidation stabilizer.

The thickeners are added to the base oils to achieve the desired rheological characteristics. The thickeners are comprised of polymeric thickening agents such as Kraton™ rubber produced by Shell, pyrogenic silica, or other polymers or copolymers that may be swelled by the base oil (such as Engage or Exact ethylene-octene copolymers produced by Dow Dupont Elastomers or Exxon/Mobil). The base oils and thickening agents are selected to achieve the desired rheological properties of the gels.

For example, the outer gel layer 20 may be formed of a very thick or lightly cross-linked gel material in order to act as a buffer layer between the optical unit 40 and buffer tube 10. The gel material of the outer gel layer 20 may be comprised of a combination of a base oil and thickener to provide a very high viscosity and yield stress. To produce the gel material of the outer gel layer 20 having the high viscosity and yield stress, a higher level of thickening agent is utilized. In accordance with a preferred embodiment of the present invention, the gel material of the outer gel layer 20 may have a yield stress greater than 50 Pascals (Pa) at 70° C. and a viscosity greater than 40,000 centipoise (cps). Preferably the yield-stress of this outer layer is above 100 Pa at 70° C. to prevent dripping of gel from large diameter tubes. To achieve such rheological properties, the gel material may include greater than about 8 weight percent pyrogenic silica thickening agent or greater than about 10 weight percent polymeric thickening agent.

Alternatively, the outer gel layer 20 may be formed of a lightly cross-linked network of a Room Temperature Vulcanizing (RTV) silicone such as RTV 6186 or RTV 6166 produced by GE. The RTV silicones can be easily pumped during initial processing and, several hours after processing, react to form a lightly cross-linked network structure that is highly flexible but will not flow out of the buffer tube 10 or allow the optical unit 40 to come into direct contact with the inner wall of the buffer tube 10.

The high yield stress of the outer gel layer 20 should ensure that the large diameter ribbon buffer tube will pass Bellcore GR-20 (Bellcore GR-20, Issue, Section 6.3.3, July 1998) compound flow requirement and FOTP-81 compound flow requirement (EIA/TIA-455-81A, EIA/TIA Standard, FOTP-81, "COMPOUND FLOW (DRIP) TEST FOR FILLED FIBER OPTIC CABLE", 1992).

As discussed above, the inner gel layer 30 may have a lower viscosity and yield stress which is less than that of the outer gel layer 20 in order to facilitate easy re-positioning of the ribbon stack when the cable is flexed. In accordance with the preferred embodiment of the present invention, the inner gel layer 30 may be comprised of base oil with less than about 10 weight percent thickening agent if a polymeric thickening agent is used and less than about 8 weight percent thickening agent if pyrogenic silica is used. In accordance with the preferred embodiment of the present invention, the gel material of the inner gel layer 20 may have a yield stress less than 20 Pa and a viscosity less than 20,000 cps at 70° C. Typically the thickening agents are the most expensive component of the gel so the use of two gels in this manner also reduces overall cost.

Although FIG. 1 illustrates the use of two gel layers within the buffer tube 1, it is possible to utilize additional gel layers or a single gel layer having graded index of yield stress and/or viscosity. Further, the inner and outer layers 30 and 20 can be a multiple part system (e.g., two-part silicone) which achieves the desired yield stress and viscosity properties in each of the desired locations. In addition, a single buffer gel layer having a continuum of yield stresses and viscosities may be utilized in place of multiple discrete gel layers, wherein the yield stress and viscosity of the gel material is a graded change from a highest yield stress and viscosity in the outermost portion nearest the buffer tube wall to a lowest viscosity in the innermost portion nearest the optical unit.

In accordance with the preferred embodiment of the present invention, the inner gel layer 30 and the outer gel layer 20 are manufactured by simultaneous co-extrusion or co-pumping of the two gel materials of the inner gel layer 30 and the outer gel layer 20. This may be accomplished by a concentric method, wherein the two gel materials are pumped simultaneously via two different paths which allow the two gel materials to finally end up in the buffer tube. Both gel materials are be placed in the tube in discrete locations based on the concentric application of the two independent materials.

By utilizing a lightly cross-linkable material for the outer gel layer 20, the fibers (not shown) of the optical unit 40 may be protected from damage when accessing the buffer tube 10. That is, the outer gel layer 20 acts as a sheath protecting the inner layer and will actually push the fibers away when the buffer tube 10 is being accessed.

Figure 2:
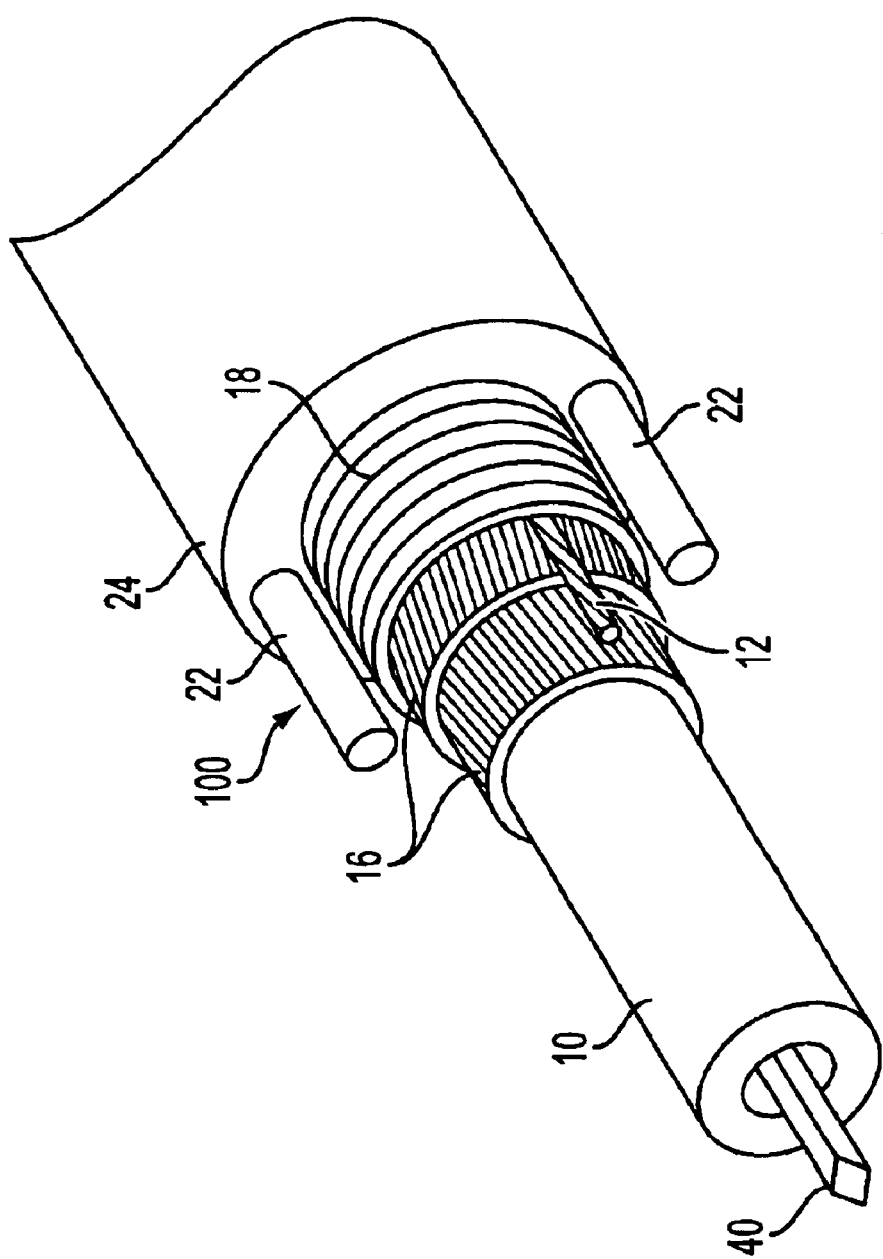
FIG. 2 illustrates a perspective cross-sectional view of a monotube optical fiber cable in accordance with the preferred embodiment of the present invention.

Referring to FIG. 2, therein is illustrated a monotube optical fiber cable as generally indicated by the numeral 100 incorporating the present invention. This cable structure 100 has a single large, buffer tube 10 made from a polyolefin material and housing the optical unit 40. The inner and outer gel layers 30 and 20 are interposed between the buffer tube 10 and the optical unit 40. Radial strength yarns 16 made of either aramid, polyethylene, polyester or fiberglass materials are contra-helically stranded around the buffer tube 10 and impregnated with filling compound such as a petroleum based hot melt filling compound. Corrugated steel armor 18 may be applied over the radial strength yarns 16 and the corrugated steel armor 18 is flooded with a water blockable flooding compound such as petroleum based hot melt filling compound manufactured by Witco Corporation, New York, N.Y. or Amoco Chemical Company, Chicago, or a petroleum based flooding compound. Alternatively, water swellable yarns or tapes may be used for water blocking. A high strength rip cord 12 is applied under the armor 18 to aid with sheath removal. Two strength members 22 are located 180 degrees apart on the outside of the corrugated armor 18. The strength members 22 may be fabricated from steel or fiber reinforced plastics. An outer jacket 24 encapsulates the strength members 22 and corrugated armor 18 to complete the structure. The outer jacket 24, may be made from a polyolefin material. The water blockable flooding compound (not shown) is disposed between the corrugated armor 18 and the outer jacket 24. Water swellable yarns or tapes may be used to replace the flooding compound, if desired.

Figure 3:
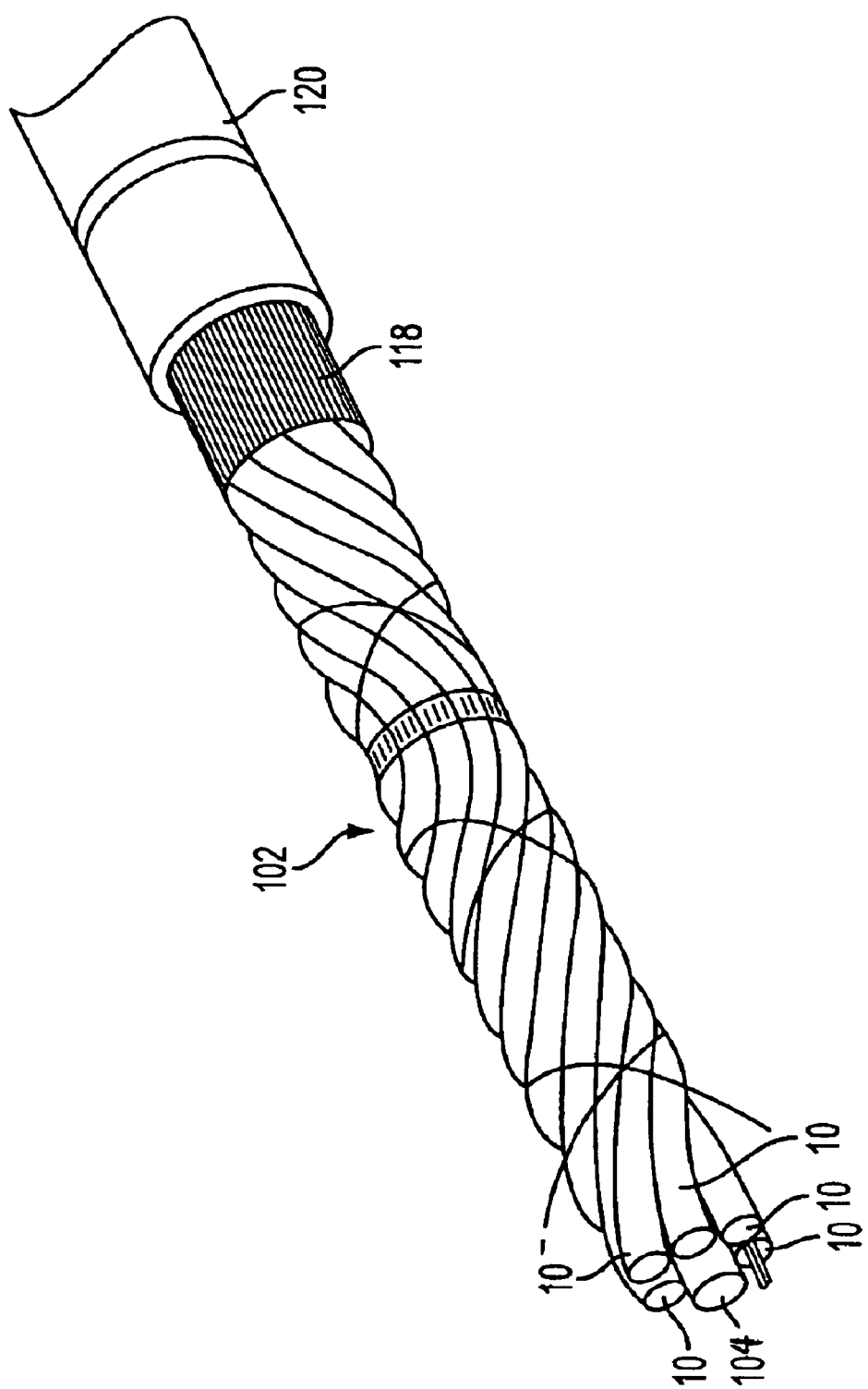
FIG. 3 illustrates a perspective cross-sectional view of a loose tube optical fiber cable in accordance with the preferred embodiment of the present invention.

The present invention can also be applied to loose tube optical fiber cables having single or multi-layer buffer tubes. FIG. 3 illustrates a reversing helically wound loose tube optical fiber cable 102. The cable 102 shown in FIG. 3 generally comprises a central strength member 104 surrounded by a plurality buffer tubes 10. Each of the buffer tubes 10 house the inner and outer gel layers (not shown) and optical unit (not shown) such as loose optical fibers or optical fiber ribbons. The cable 102 further comprises armoring 118, and a protective outer jacket 120, among other things. The buffer tubes 10, for example, are fabricated from polyolefin material.

Although certain preferred embodiments of the present invention have been described, the spirit and scope of the invention is by no means restricted to what is described above. In particular, the present invention may be applicable to any optical fiber cable wherein maintaining the optical unit in central location is desirable. For example, the present invention is clearly applicable to slotted core cables by advantageously maintaining ribbon stack integrity within the slot and preventing misalignment of the ribbon stack in the slot which can lead to attenuation.

Accordingly, persons skilled in the art will recognize that many variations of the teachings of this invention can be practiced that still fall within the claims of this invention which follow.

What is claimed is:

1. An optical fiber cable, comprising:
   a buffer tube;
   an optical unit disposed in the buffer tube, the optical unit including at least one optical fiber; and
   at least first and second gel layers interposed between the buffer tube and the optical unit, wherein the first gel layer surrounds the optical unit, the second gel layer surrounds the first gel layer, and the first and second gel layers have different rheological properties.

2. The optical fiber cable of claim 1, wherein the different rheological properties of the first and second gel layers include at least one of viscosity and yield stress.

3. The optical cable of claim 2, the first gel layer is formed of a first material which is compatible with a material of the optical unit, and the second gel layer is formed of a material which is compatible with a material of the buffer tube.

4. The optical cable of claim 2, wherein the viscosity of the first gel layer is less than the viscosity of the second gel layer.

5. The optical cable of claim 4, wherein the viscosity of the first gel layer is less than 20,000 cps at 23° C.

6. The optical cable of claim 4, wherein the viscosity of the second gel layer is greater than 40,000 cps at 23° C.

7. The optical cable of claim 4, wherein the viscosity of the first gel layer is less than 20,000 cps at 23° C. and the viscosity of the second gel layer is greater than 40,000 cps at 23° C.

8. The optical cable of claim 2, wherein the yield stress of the first gel layer is less than the yield stress of the second gel layer.

9. The optical cable of claim 8, wherein the yield stress of the first gel layer is less than 20 Pa at 70° C.

10. The optical cable of claim 8, wherein the yield stress of the second gel layer is greater than 50 Pa at 70° C.

11. The optical cable of claim 8, wherein the yield stress of the second gel layer is greater than 100 Pa at 70° C.

12. The optical cable of claim 8, wherein the yield stress of the first gel layer is less than 20 Pa at 70° C. and the yield stress of the second gel layer is greater than 50 Pa at 70° C.

13. The optical cable of claim 2, wherein the viscosity and the yield stress of the first gel layer are less than the viscosity and the yield stress of the second gel layer.

14. The optical cable of claim 13, wherein the viscosity of the first gel layer is less than 20,000 cps at 23° C., the viscosity of the second gel layer is greater than 40,000 cps at 23° C., the yield stress of the first gel layer is less than 20 Pa at 70° C. and the yield stress of the second gel layer is greater than 50 Pa at 70° C.

15. The optical cable of claim 13, wherein the viscosity of the first gel layer is less than 20,000 cps at 23° C., the viscosity of the second gel layer is greater than 40,000 cps at 23° C., the yield stress of the first gel layer is less than 20 Pa and the yield stress of the second gel layer is greater than 100 Pa at 70° C.

16. The optical cable of claim 13, wherein the first gel layer is formed of a first material which is compatible with a material of the optical unit and the second gel layer is formed of a material which is compatible with a material of the buffer tube.

17. The optical cable of claim 2, wherein the first gel layer is adapted to maintain the optical unit in an axial center position of the buffer tube.

18. The optical cable of claim 3, wherein each of the first and second gel layers comprises a thickening agent and at least one of a polyolefin oil and a polybutene oil.

19. The optical cable of claim 18, wherein the thickening agent of the first gel layer comprises a polymeric thickening agent of less than about 10 weight percent or a pyrogenic thickening agent of less than about 8 weight percent.

20. The optical cable of claim 18, wherein the thickening agent of the second gel layer comprises a polymeric thickening agent of greater than about 10 weight percent or a pyrogenic thickening agent of greater than about 8 weight percent.

21. The optical cable of claim 18, wherein the thickening agent of the first gel layer comprises a polymeric thickening agent of less than about 10 weight percent or a pyrogenic thickening agent of less than about 8 weight percent, and the thickening agent of the second gel layer comprises a polymeric thickening agent of greater than about 10 weight percent or a pyrogenic thickening agent of greater than about 8 weight percent.

22. The optical cable of claim 3, wherein each of the first and second gel layers comprises a silicone material.

23. The optical cable of claim 3, wherein the second gel layer comprises a cross-linked material.

24. An optical fiber cable, comprising:

a buffer tube;

an optical unit disposed in the buffer tube, the optical unit including at least one optical fiber; and a plurality of gel layers interposed between the buffer tube and the optical unit, wherein a first gel layer surrounds the optical unit, a second gel layer surrounds the first gel layer, and gel layers have different rheological properties including at least one of viscosity and yield stress.

25. The optical fiber cable of claim 24, wherein the viscosity of the first gel layer is lower than the viscosity of the second gel layer.

26. The optical fiber cable of claim 24, wherein the yield stress of the first gel layer is lower than the yield stress of the second gel layer.

27. The optical cable of claim 24, wherein the first gel layer is formed of a first material which is compatible with a material of the optical unit, and the second gel layer is formed of a material which is compatible with a material of the buffer tube.

28. An optical fiber cable, comprising:

an optical unit including at least one optical fiber; and a first gel layer disposed around the optical unit; and a second gel layer disposed around the first gel layer, wherein the first and second gel layers are in contact with each other and have different rheological properties including at least one of viscosity and yield stress.

29. The optical fiber cable of claim 28, wherein the viscosity of the first gel layer is lower than the viscosity of the viscosity of the second gel layer.

30. The optical fiber cable of claim 28, wherein the yield stress of the first gel layer is lower than the yield stress of the second gel layer.

31. The optical cable of claim 28, wherein the viscosity and the yield stress of the first gel layer are less than the viscosity and the yield stress of the second gel layer.

* * * * *